July 22, 1941.    Q. G. NOBLITT ET AL    2,250,117
FITTING FOR AUTOMOBILE-BODY HEATING SYSTEM
Filed Nov. 5, 1938
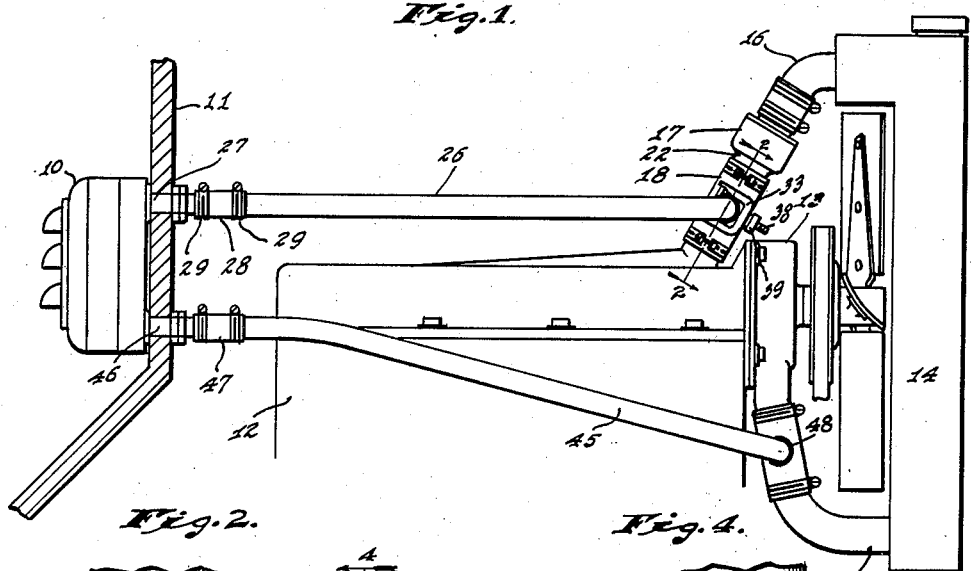
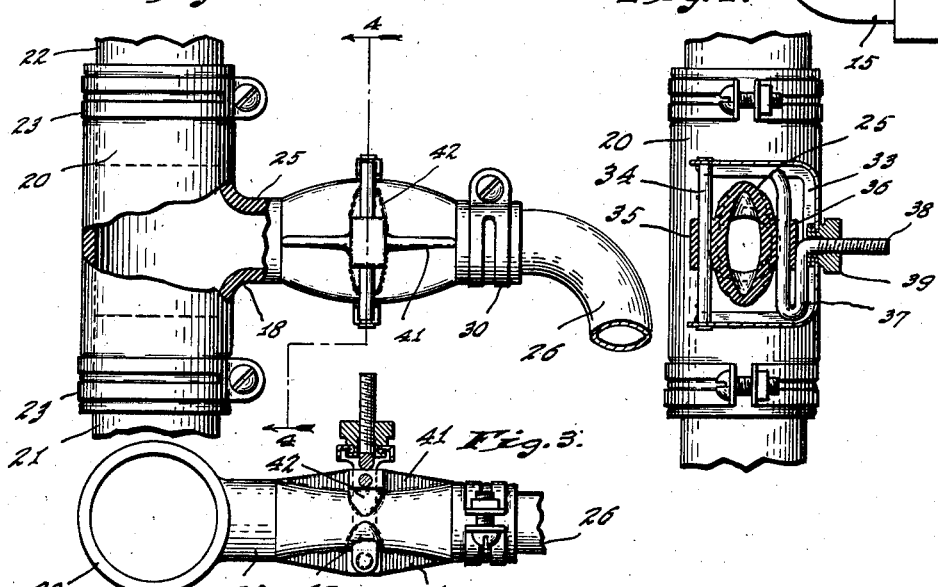
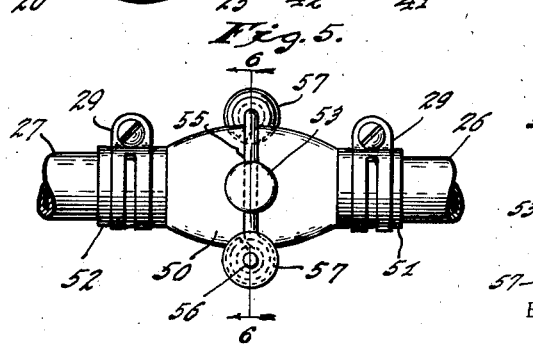
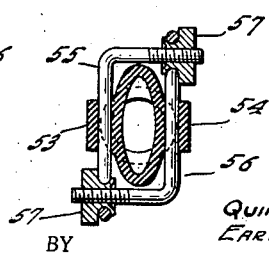
INVENTORS.
QUINTIN G. NOBLITT and
EARL C. BOOTH,
BY
ATTORNEYS.

Patented July 22, 1941

2,250,117

UNITED STATES PATENT OFFICE 2,250,117

FITTING FOR AUTOMOBILE-BODY HEATING SYSTEM

Quintin G. Noblitt and Earl C. Booth, Columbus, Ind., assignors to Noblitt-Sparks Industries, Inc., Columbus, Ind., a corporation of Indiana Application November 5, 1938, Serial No. 238,982

4 Claims. (Cl. 251—5)

Our invention relates to automobile-body heaters of the circulating-fluid type, and more specifically to the manner in which such heaters are connected into the cooling system of the automobile engine. In customary arrangements heretofore employed, water from the engine cooling system has been conveyed to the heater and returned to the cooling system through flexible rubber hose. Usually one of such hoses, and sometimes both, have been connected to larger hoses forming part of the regular engine-cooling system and disposed between the engine and the radiator, each such connection being effected through the medium of a nipple mounted in the wall of the larger hose and receivable within the end of the smaller hose leading to or from the heater.

While such arrangements are satisfactory for use in connection with automobile engines having water pumps that generate relatively high pressures, they do not operate with uniform satisfaction where pump pressure is low; for the restriction imposed by the nipple above referred to unduly decreases the amount of water which will flow through the heater.

It is the primary object of our invention to increase the quantity of water supplied to an automobile-body heater, especially a heater associated with an engine having a water-circulating pump which generates relatively low pressures. More specifically, it is our object to improve the means employed to interconnect the heater with the water-circulating system of the engine so as to avoid undue restriction of water passages. Another object of our invention is to provide an improved and simplified valve for controlling the flow of water through the heater.

In carrying out our invention, we employ metal tubing for the conduits through which water is supplied to and conveyed from the heater; and for the purpose of interconnecting such metal tubes into the water-circulating system of the engine, we employ one or more specially constructed fittings of rubber or similar yielding material. Each of such fittings, in general form, resembles a conventional pipe T the "run" of which forms part of a conduit interconnecting the radiator and engine water-jacket and the "lateral" of which receives and is clamped upon an end of one of the aforesaid tubes. The metal tubes are connected to the heater by means of couplings of rubber tubing or other similar material each of which receives an end of one of the metal tubes and a nipple on the heater. The valve which we prefer to employ is incorporated either in one of the couplings just referred to or in the lateral of one of the T fittings, and comprises means for releasably collapsing the coupling or T-lateral to control the flow of water therethrough.

The accompanying drawing illustrates our invention: Fig. 1 is a side elevation of a complete installation, showing an automobile-body heater, an engine, and conduits and fittings employed to interconnect the heater with the water-circulating system of the engine; Fig. 2 is an enlarged view of one of the flexible T's employed, partly broken away to show in section on the line 2—2 of Fig. 1; Fig. 3 is an end elevation of the T shown in Fig. 2; Fig. 4 is a transverse section on the line 4—4 of Fig. 2; Fig. 5 illustrates a valve embodied in a simple coupling member; and Fig. 6 is a section on the line 6—6 of Fig. 5.

In Fig. 1, we have illustrated an automobile-body heater 10 mounted on the dash 11 of the automobile and connected to the water-circulating system of the automobile engine 12. As shown, the engine 12 has associated with it a pump 13 which receives water from the radiator 14 through a conduit 15 and which discharges through the water-jacket of the engine and a conduit 16 into the top of the radiator. The conduit 16 may include a thermostatic valve 17 to prevent circulation of the cooling water through the radiator 14 until after such water has attained a predetermined minimum temperature.

It is customary in automobiles to interconnect the radiator 14 with the pump and water jacket of the engine through short lengths of flexible hose, in order to relieve strains resulting from vibrations. In practicing our invention, we substitute for one or both of such hoses specially formed T fittings of soft rubber or equivalent material. One of such T fittings is indicated by the reference numeral 18 in the drawing and is shown as incorporated in the conduit 16 between the water jacket of the engine 12 and the thermostatic valve 17.

As is clear from Fig. 2 the T comprises a run 20 of relatively large diameter the ends of which receive respectively the discharge nipple 21 of the engine water jacket and a neck 22 on the thermostatic valve 17. Hose clamps 23 of any convenient form are used to effect a tight joint between the run of the T and the parts it interconnects. The lateral 25 of the T is adapted to receive the front end of a metal tube 26 which extends rearwardly and is connected to the inlet nipple 27 of the heater 10, conveniently by a short length of flexible hose 28 clamped to the parts it interconnects by hose clamps 29. Another hose clamp 30 serves to contract the lateral 25 of the T upon the forward end of the tube 26.

In the arrangement shown in the drawing, a valve controlling the supply of water to the heater 10 is incorporated in the lateral 25 of the T. As shown, this lateral is flattened into a generally elliptical form intermediate its ends and correspondingly widened to avoid reduction of its cross-sectional area. Desirably, the inclination of the walls of the lateral 25 which effects this flattening and widening is a gradual and smooth inclination to reduce resistance to flow.

Embracing the flattened portion of the lateral 25, we provide a yoke 33 having across its open end a rod 34 which passes through a lug 35 formed integrally with the lateral 25 on one of the flattened sides thereof. A similar lug 36 on the opposite side of the branch 25 receives a clamping member 37 having a screw-threaded shank 38 which is received in a nut 39 mounted in the yoke 33. Conveniently, the yoke 33 is formed as a sheet-metal stamping of channel-section, and the ends of the clamping member 37 are received within the channel of the yoke so as to prevent rotation of the clamping member from its normal position in the plane of the yoke.

As will readily be apparent, by rotating the nut 39 the clamping member 37 can be forced toward the rod 35 to collapse the lateral 25 and prevent the flow of water therethrough. Upon rotation of the nut 39 in the opposite direction, the rod 35 and clamping member 37 will be positively separated and the lateral 25 re-opened to permit water to flow therethrough to the heater. To strengthen the lateral 25 and make it more durable, its flattened portion may be provided externally with integral reinforcing ribs 41 and 42.

Water returned to the engine-cooling system from the heater may be conveyed through a second metal tube 45 connected at its rear end to the outlet nipple 46 of the heater, as by means of a short hose connection 47 similar to the hose connection 28. The front end of the tube 45 may be connected to the engine-cooling system by means of a T 48 interposed between the conduit 15 and the pump 13. The T 48 may be similar to the T 20 except, of course, that its lateral need not include a valve.

Instead of incorporating the valve in one of the T's we may incorporate it in one of the hose couplings used to interconnect the heater with the supply and discharge tubes 26 and 45. Such an arrangement is shown in Figs. 5 and 6, where a specially constructed coupling 50 is interposed between the water supply tube 26 and the inlet nipple 27 of the heater. The coupling 50 is of rubber or equivalent material and has end portions 51 and 52 adapted to receive the tube 26 and nipple 27 respectively, hose clamps 29 serving to effect tight joints. The central portion of the fitting 20 is flattened and widened similarly to the lateral 25 of the T 20, and has on its opposite sides lugs 53 and 54 provided with transversely extending openings for the reception of portions of the clamp.

The clamp shown in Figs. 5 and 6 is of somewhat different construction from that shown in Figs. 2, 3, and 4, and comprises a pair of L-shaped members 55 and 56. One leg of each of the L-shaped members is formed into an eye while the other leg is screw-threaded, and in each eye there is mounted a nut 57 receiving the screw-threaded end of the other clamping member. As is clear from Fig. 6, the nuts 57 may be operated either to collapse the fitting 50 and shut off the supply of water to the heater or to open such fitting and permit water to flow therethrough.

Several features of the system described contribute to the obtaining of adequate water circulation through the heater 10 even when the pump 13 generates a relatively low pressure. In the first place, for any given external diameter, the metal tubes 26 and 45 have a substantially larger internal diameter than would rubber tubes capable of carrying the fluid pressures encountered in service. In the second place, the fittings employed to interconnect the tubes 26 and 45 with the heater and with the water-circulating system of the engine are all of larger internal diameter than the tubes themselves, and therefore impose no restriction on the free flow of water. In the third place, the valve employed imposes no abrupt changes of direction upon the water flowing through it, and therefore results in less loss of head than that which characterizes conventional valves. Lastly, the interior walls of the lateral 25 may be formed to join the walls of the run 20 of each T in smooth curves imposing little resistance to water flow.

We claim as our invention:

1. A fitting for use in connecting an automobile-body heater of the circulating fluid type into the engine cooling system, said fitting comprising a unitary T of compressible material having a run and a lateral integral with each other, the ends of said run and the outer end of said lateral being adapted to receive rigid conduits, and means associated with said lateral for collapsing its walls to regulate the quantity of water passing through it.

2. A fitting for use in connecting an automobile-body heater of the circulating fluid type into the engine cooling system, said fitting comprising a tubular body of yielding material provided exteriorly with diametrically opposite lugs having transverse holes therethrough, generally parallel members disposed in said holes, and means for moving said members toward each other to collapse the body and prevent the flow of liquid therethrough or away from each other to restore the body to normal condition.

3. A fitting for use in connecting an automobile-body heater of the circulating fluid type into the engine cooling system, said fitting comprising a tubular body of yielding material provided exteriorly with diametrically opposite lugs having transverse holes therethrough, a U-shaped yoke of sheet-metal straddling said fitting in the plane of said lugs, the parallel legs of said yoke being of channel cross-section and opening toward each other, a pin passing through the transverse hole in one of said lugs and having its ends secured to the parallel legs of said yoke, a T-shaped member having a cross bar and a central shank, said cross bar extending through the hole in the other lug with its ends slidably received in the parallel legs of said yoke, and a nut rotatably mounted in the intermediate leg of said yoke, the shank of said T-shaped member being screw-threaded and being received in said nut.

4. A fitting for use in connecting an automobile-body heater of the circulating fluid type into the engine cooling system, said fitting comprising a unitary T of compressible material having a run and a lateral integral with each other, the ends of said run and the outer end of said lateral being circular in cross-section and adapted to receive rigid conduits, an intermediate portion of said lateral between its circular end and said run having a generally elliptical cross-section, and means associated with said intermediate lateral-portion for collapsing its walls in the direction of the minor axis of its cross-section to regulate the quantity of water passing through it.

QUINTIN G. NOBLITT,
EARL C. BOOTH.